United States Patent
Das Sharma et al.

(10) Patent No.: US 9,645,965 B2
(45) Date of Patent: May 9, 2017

(54) APPARATUS, SYSTEM, AND METHOD FOR IMPROVING EQUALIZATION WITH A HARDWARE DRIVEN ALGORITHM

(71) Applicants: Debendra Das Sharma, Saratoga, CA (US); Kanaka Lakshimi Siva Prasad Gadey Naga Venkata, Fremont, CA (US); Prahladachar Jayaprakash Bharadwaj, Sunnyvale, CA (US)

(72) Inventors: Debendra Das Sharma, Saratoga, CA (US); Kanaka Lakshimi Siva Prasad Gadey Naga Venkata, Fremont, CA (US); Prahladachar Jayaprakash Bharadwaj, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 640 days.

(21) Appl. No.: 13/840,104

(22) Filed: Mar. 15, 2013

(65) Prior Publication Data

US 2014/0281068 A1    Sep. 18, 2014

(51) Int. Cl.
*H04B 15/00*    (2006.01)
*G06F 13/42*    (2006.01)
(Continued)

(52) U.S. Cl.
CPC ........ *G06F 13/4282* (2013.01); *H04L 5/1438* (2013.01); *H04L 25/0272* (2013.01); *H04L 25/03019* (2013.01); *H04L 25/03885* (2013.01); *H04L 2025/03802* (2013.01); *H04L 2025/03808* (2013.01)

(58) Field of Classification Search
CPC ..... H04L 1/243; H04L 1/0001; H04L 1/0009; H04L 1/1854; H04L 25/03038; H04L 25/03057; H04L 2025/03617; H04L 2025/03477; H04L 25/14; H04L 25/4925; H04L 5/20; H04L 25/0272; H04L 25/49; G01R 31/31; H03H 21/0012
USPC ................ 375/219–223, 229–233, 257–258, 375/286–288, 295–296, 316, 346–351
See application file for complete search history.

(56) References Cited

U.S. PATENT DOCUMENTS 9,124,455 B1 * 9/2015 Lim ................. H04L 25/03343
2005/0135568 A1   6/2005 Qiu
(Continued)

OTHER PUBLICATIONS

Extended European Search Report received for European Patent Application No. 14160300.1, mailed on Jul. 11, 2014, 9 pages.
(Continued)

*Primary Examiner* — James M Perez
(74) *Attorney, Agent, or Firm* — The Law Office of Herbert T. Patty

(57) ABSTRACT

A system and method comprising, in response to a first component and a link partner of the first component, undergoing equalization, the first component is to communicate a first set of data to the link partner component. The first component may comprise at least one receiver to receive a first set of equalization data. The first component may further comprise coefficient storage coupled to the receiver to store the equalization data. In addition, coefficient logic coupled to the coefficient storage to generate a first set of coefficients based on the first set of equalization data. The first component is to send the first set of coefficients to the link partner component.

24 Claims, 9 Drawing Sheets

(51) Int. Cl.
*H04L 5/14* (2006.01)
*H04L 25/02* (2006.01)
*H04L 25/03* (2006.01)

(56) References Cited

U.S. PATENT DOCUMENTS

| | | | |
|---|---|---|---|
| 2013/0067127 A1 | 3/2013 | Hopgood et al. | |
| 2014/0092952 A1* | 4/2014 | Aguilar-Arreola | H04L 27/01 375/233 |
| 2014/0181339 A1* | 6/2014 | Hopgood | G06F 13/20 710/107 |
| 2014/0281067 A1* | 9/2014 | Das Sharma | G06F 13/385 710/104 |

OTHER PUBLICATIONS

Supplementary European Search Report received for European Patent Application No. 14160300.1, mailed on Sep. 22, 2014, 3 pages.

PCI Express, "PCI Express Base Specification Revision 3.0", Introduction and Physical Layer Specification, XP055096393, Nov. 10, 2010, pp. 37-412.

Peng M., "Datenraten bis zu 8,5 6bit/s", Bauelemente, XP007905251, ISSN: 0013-5658, Jun. 10, 2008, pp. 38-41.

\* cited by examiner

APPARATUS, SYSTEM, AND METHOD FOR IMPROVING EQUALIZATION WITH A HARDWARE DRIVEN ALGORITHM

FIELD

This disclosure pertains to computing systems, and in particular (but not exclusively) to techniques for improving a link training and equalization procedure.

DETAILED DESCRIPTION

Figure 1:
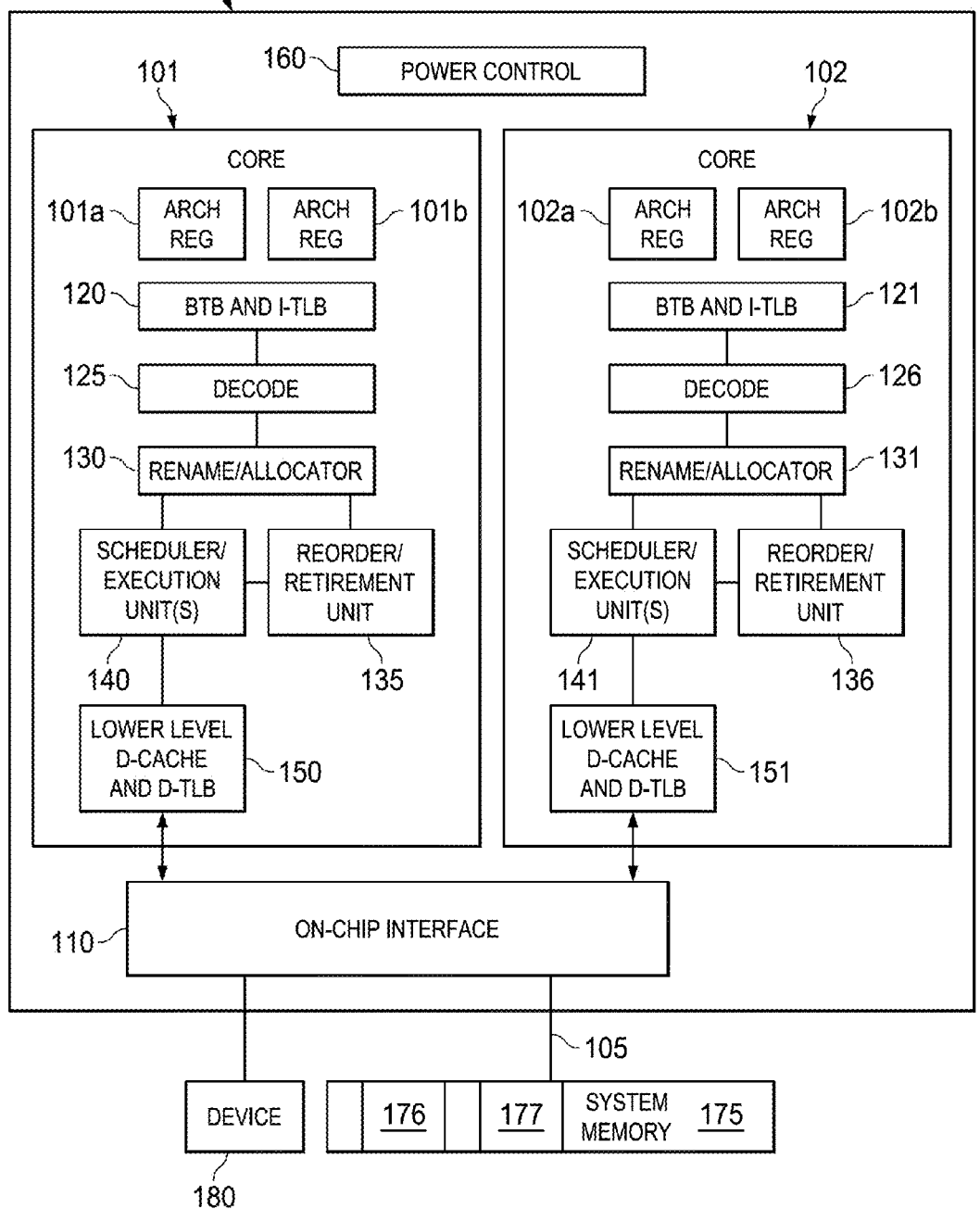
FIG. 1 is a schematic diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems advance, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SoC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SoC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
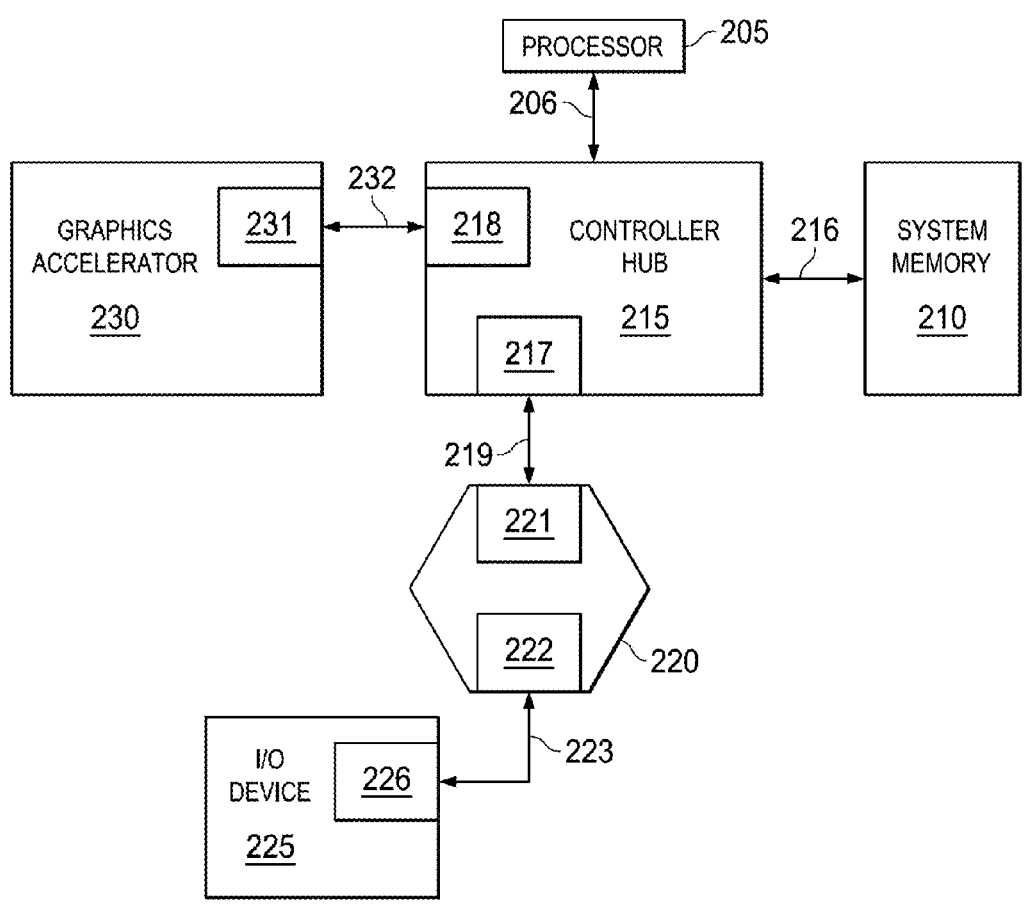
FIG. 2 is a schematic diagram illustrating an embodiment of a computing system including an a peripheral component interconnect express (PCIe) compliant architecture.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In some embodiments, peer-to-peer routing is optionally supported through the root complex device.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225. Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
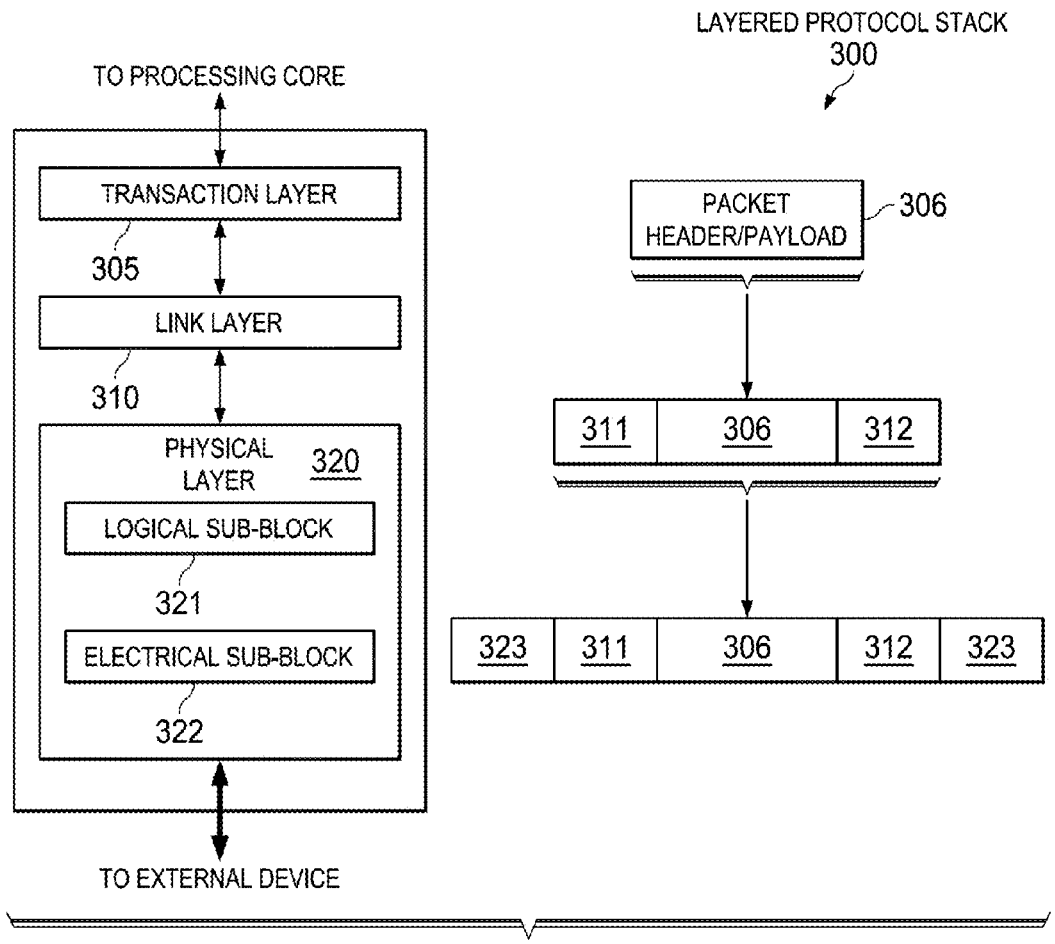
FIG. 3 is a schematic diagram illustrating an embodiment of a PCIe compliant interconnect architecture including a layered stack.

Turning to FIG. 3 an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 317, 318, 321, 322, 326, and 331 in FIG. 1, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that may be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The translation layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Figure 4:
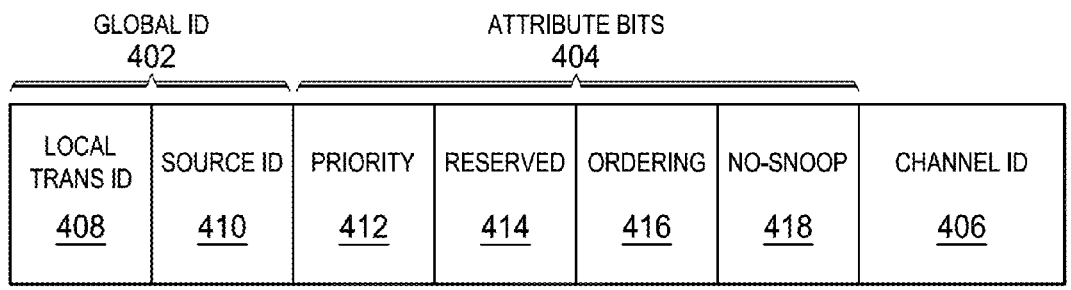
FIG. 4 is a schematic diagram illustrating an embodiment of a PCIe compliant request or packet to be generated or received within an interconnect architecture.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes may pass writes in the same direction, and read completions may pass writes in the same direction. Snoop attribute field 418 is utilized to determine if transactions are snooped. As shown, channel ID Field 406 identifies a channel that a transaction is associated with.

Link Layer (Refer to FIG. 3)

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an $8b/10b$ transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

As the frequency of serial links increase and chips migrate to new process technologies with ever decreasing device sizes, it becomes increasingly important to provide the capability to dynamically adjust the transmitter and receiver equalization settings to account for the platform and silicon variations.

PCIe Generation 3 (PCIe Gen3) is an example of an industry standard that had to so equalization on a per transmitter-receiver pair basis to ensure interoperability at 8 GT/s for the wide range of systems that deploy PCIe. However, the wide a variety of devices, manufactured by different vendors, with different process technologies, each with their proprietary transmitter/receiver design, and proprietary hardware algorithms to adapt makes it a challenge to design components with guaranteed interoperability.

The present disclosure may be applied to an upstream port, downstream port, or both. In some embodiments, link training and equalization procedure includes two passes as will be described in detail below.

Figure 5:
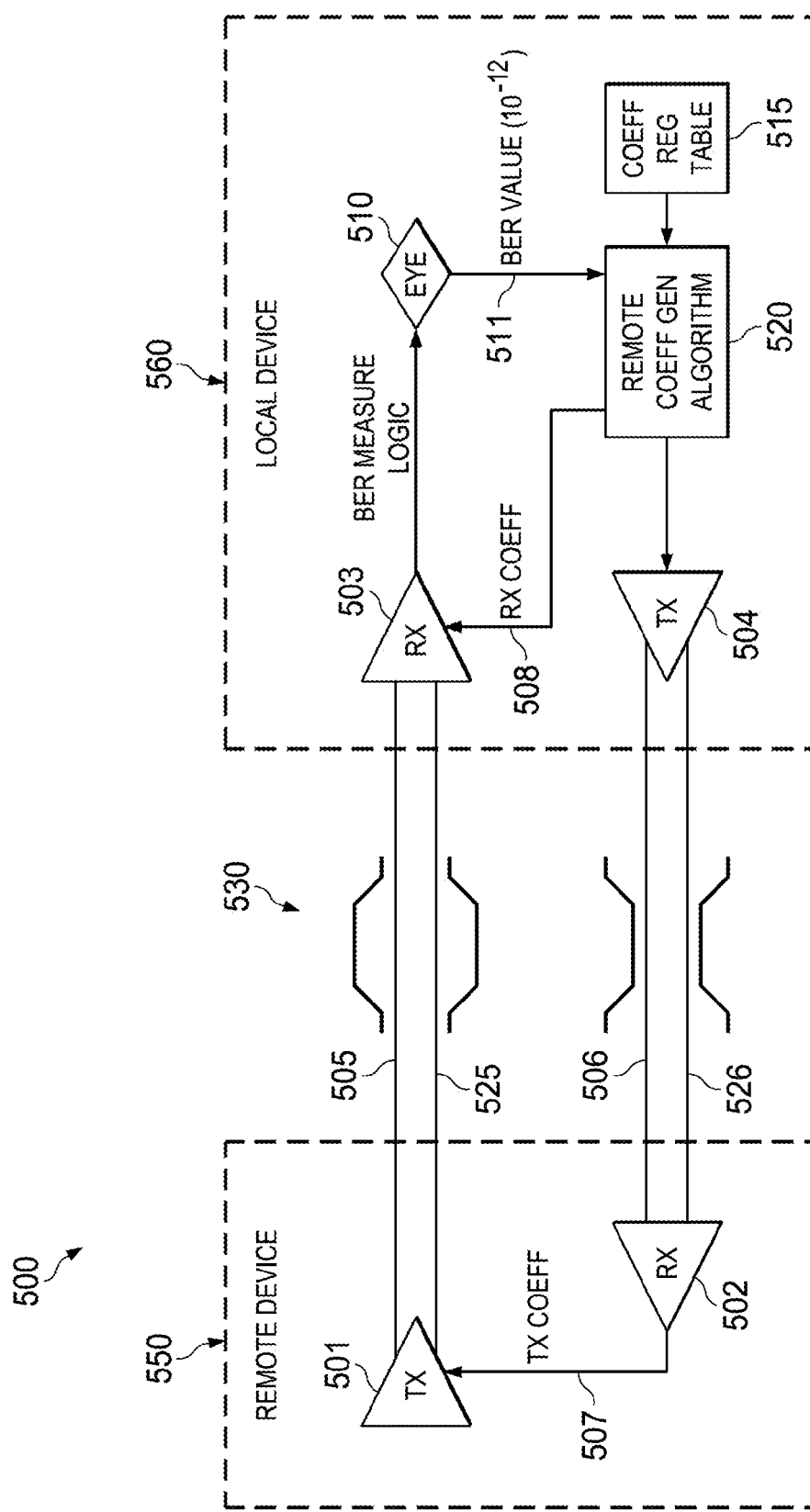
FIG. 5 is a schematic diagram illustrating an embodiment of a PCIe serial point to point fabric.

Referring next to FIG. 5, an embodiment of a PCIe serial point to point fabric 500 is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 501/504 and a receive pair 502/503.

Accordingly, device 550 includes transmission logic 501 to transmit data to device 510 and receiving logic 507 to receive data from device 560. In other words, with respect to device 550, two transmitting paths, i.e. paths 505 and 525, and two receiving paths, i.e. paths 506 and 526, are included in a PCIe link.

A transmission path may refer to any path for transmitting data, such as a transmission line, a copper line, an optical line, a wireless communication channel, an infrared communication link, or other communication path. A connection between two devices, such as device 550 and device 560, is referred to as a link, such as link 530. In some embodiments, link 530 is a PCIe bus interface link.

A link may support multiple lanes—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some embodiments, a lane may be referred to as a channel of a communications link (e.g., link 530). Moreover, in the schematic diagram of FIG. 5, only one lane (pairs 505/525 and 506/526) is shown in the PCIe serial point to point fabric 500.

PCIe link 530 may enable devices 550, 560 to communicate with one another. In some embodiments of the present disclosure, device 560 is a local device whereas device 550 may be a remote device. Furthermore, either device 550 or device 560 may be characterized as a root complex device or an endpoint device. For example, in some embodiments, device 560 is a root complex device and device 550 is an endpoint device. Notably, because device 550 and device 560 may communicate to each other along link 530, device 550 and device 560 may be referred to as "link partners" to one another.

A differential pair may refer to two transmission paths, such as lines 505 and 525, to transmit differential signals. As an example, when line 505 toggles from a low voltage level to a high voltage level, i.e. a rising edge, line 525 drives from a high logic level to a low logic level (i.e. a falling edge). Differential signals potentially demonstrate better electrical characteristics, such as better signal integrity, i.e. crosscoupling, voltage overshoot/undershoot, ringing, etc. This allows for better timing window, which enables faster transmission frequencies.

In addition, a transmitter or receiver component (e.g., transmission logic 501/504, receiver logic 502/503) of a device (e.g. device 550 or device 560) may have transmitter or receiver settings, respectively, which may be set, adjusted, optimized, etc. In some embodiments, a set of coefficients may be applied to the transmitter or receiver settings with the aim to achieve communication capability between the devices 550, 560 with minimal data loss.

For example, a bit error rate (BER), which may define the threshold error rate for data transmitted from one device to the other for any particular lane or link. For instance, the BER for a given link may be $10^{-4}$ or $10^{-12}$ depending on the threshold specified by the link training and equalization procedure of a particular communications protocol. In the embodiment shown in FIG. 5, the BER for each lane of link 530 is $10^{-12}$.

One having ordinary skill in the art may appreciate that a bit error rate (BER) may be defined as the ratio of the number of bits incorrectly received (errors) and the total number of bits received, according to some embodiments of the present disclosure.

In some embodiments, the set of coefficients may be generated within a remote coefficient algorithm module 520 from coefficient data stored in a coefficient register table 515. Once the coefficients are derived, they may be transferred to transmission logic 501/504 and receiver logic 502/503 (e.g., paths 507, 508 in the figure). Alternatively, a set of default coefficients located within registers of the transmitter or receiver components (e.g., provided by manufacturer) of the devices 550, 560 may be applied to the transmission and receiver logic 506, 507. Moreover, a set of coefficients may be communicated to each device 550, 560 via symbols (TS1/TS2 symbols) to each link partner during a protocol defined Link Training and Status State Machine (LTSSM) states according to an embodiment which employs PCIe.

In some embodiments, the generated coefficients may be applied to a finite impulse response (FIR) filter to determine whether the transmission logic 501/504 or receiver logic 502/503 is performing optimally, according to pre-define conditions.

Advantageously, an adaptive FIR filter may be utilized in link training and equalization procedures to identify coefficients during runtime according to particular attributes of a physical channel (e.g., lane or link).

Most notably, in some embodiments of the present disclosure, a new set of coefficients are generated and passed along to the transmission logic 501/504 or receiver logic 502/503 respectively until the target BER is reached. For example, if the target BER is $10^{-12}$, the error rate of data transmitted is measured (e.g. BER eye 510), results of which are sent to the remote coefficient generation algorithm module 520 (e.g., path 511), and new coefficients are generated if the target BER is not achieved. Once the target BER is achieved, no new coefficients are generated and applied to the transmission and receiver logic 502/503.

The present disclosure provides a mechanism to reduce the time for link training and equalization and increase its reliability. In some embodiments, a link training and equalization procedure consistent with the present disclosure may utilize a software application which executes an algorithm to generate a set of coefficients to be applied to a transmission logic or receiver logic settings.

In some embodiments, the software application reads a full swing (FS) value and low frequency (LF) value associated with a device coupled to the bus interface link (e.g., root complex device or endpoint device) from a storage unit or element (e.g. configuration and status register) and inputs these values into an algorithm to generate a set of coefficients to be applied to transmitter or receiver settings of a device coupled to the bus interface link.

In some embodiments, the software application generates coefficients to be applied to the transmitter component of an endpoint device such that a root complex device may meet the targeted BER during Phase 2 or 3 of a PCIe link training and equalization procedure.

However, in yet other embodiments, logic present in lanes of an upstream port or a downstream port may be used to generate a set of coefficients from a full swing value and a low frequency value as will be described in more detail below.

Link training and equalization may be performed either at the transmission logic 501/504 or the receiver logic 502/503. One having ordinary skill in the art may appreciate that because a received signal may be mixed with channel noise, link training and equalization procedure(s) may add noise and degrade the signal to noise ratio (SNR) associated with a given lane which is typically not characterized with receiver logic 502/503. Therefore, in some embodiments, link training and equalization may be effective at the transmitter side (e.g., transmission logic 501/504).

Figure 6:
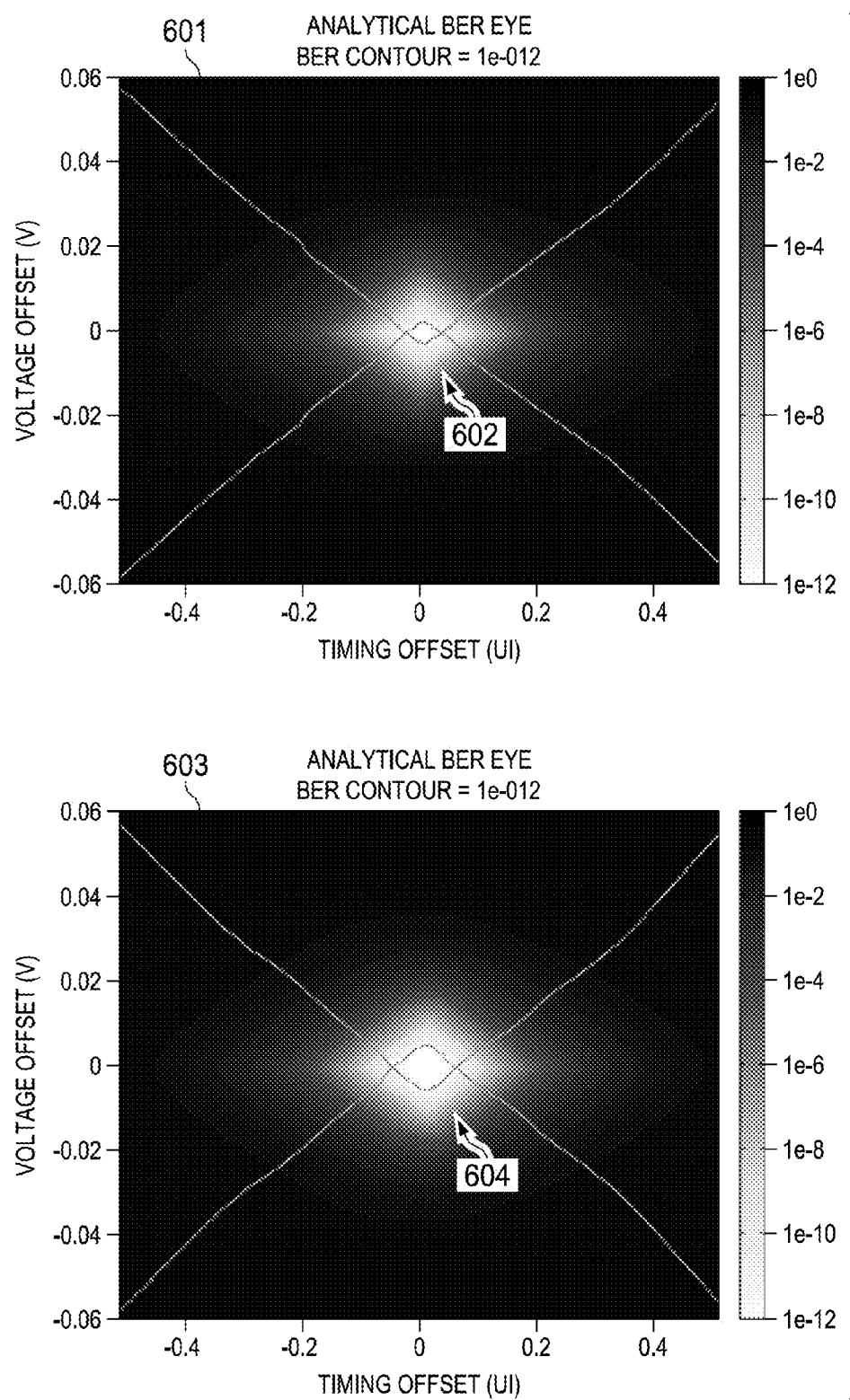
FIG. 6 is a schematic diagram illustrating a plot of a bit error rate (BER) eye with best pre-set and a plot of a BER eye with optimized transmitter coefficients.

Moving forward through the figures, FIG. 6 is a schematic diagram illustrating plots of bit error rate (BER) eye diagrams with best pre-sets and optimized transmitter coefficients. One having ordinary skill in the art may appreciate that a BER eye plot is an intuitive graphical representation of electrical and optical communication signals. As such, the quality of signals transmitted and received in a communications channel may be judged from the appearance of a BER eye plot. BER eye plots may help determine whether a communication system may faithfully transmit bits of data with as few errors as possible.

FIG. 6 shows diagram illustrating a plot 601 of a bit error rate (BER) eye 602 with best pre-set coefficients and a plot 603 of a BER eye 604 with optimized transmitter or receiver coefficients. As shown, the height of the BER eye 602 in plot 601 is less than the height of the BER eye 604 in plot 603. One having ordinary skill in the art may appreciate that the BER eye height defines a noise margin of the system. In some embodiments, a higher BER eye indicates less noise in a communications channel than channel noise attributed to a smaller BER eye.

Therefore, according to some embodiments of the present disclosure, the BER eye 604 in plot 603 indicates less noise and a lower bit error rate in the communications channel due to optimized transmitter or receiver settings. Alternatively, the BER eye 602 in plot 601 indicates greater noise and a higher bit error rate in the communications channel attributed to the best pre-set coefficients.

Accordingly, a lower bit error rate may be achieved in a channel of a communications link (e.g., lane of a bus interface link) when an optimized set of coefficients are applied to a transmitter or receiver component (e.g., transmission logic or receiver logic). As such, optimized transmitter or receiver coefficients take into account the physical characteristics of a particular channel of a communications link. A system and method consistent with the present disclosure includes identifying optimal transmitter or receiver coefficients to decrease a bit error rate to increase data transmission performance within communication systems.

Figure 7:
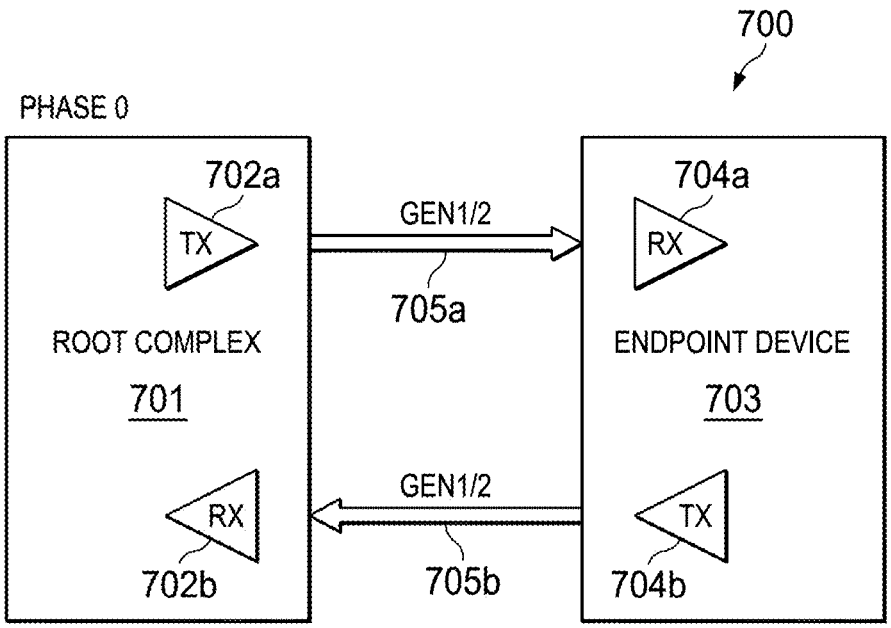
FIG. 7 is a schematic diagram illustrating an embodiment of Phase 0 of a PCIe link training and equalization procedure.

FIG. 7 is a schematic diagram 700 illustrating an embodiment of Phase 0 of a PCIe link training and equalization procedure. As shown, two components, root complex device 701 and endpoint device 703 are coupled to each other via differential pairs 705a/705b (shown as arrows) of a communications link.

Furthermore, root complex device 701 and endpoint device 703 includes transmission logic (702a, 704b respectively) and receiver logic (704a, 704b) to enable communication between the two devices 701, 703. In some embodiments, root complex device 701 and endpoint device 703 may be characterized as a downstream port and an upstream port, respectively.

In some embodiments, Phase 0 (e.g., of a PCIe link training and equalization procedure) may include transmitting a first set of data (e.g., TS1 Ordered Sets, Preset value(s), Hints, etc.) from the upstream port (e.g., endpoint device 701) to the downstream port (e.g., root complex device 703).

Data may be transferred between the devices 701, 703 at a first data transmission rate. For example, the first data transmission rate may be less than or equal to a first maximum data transmission rate associated with the root complex device 701 and a second maximum data transmission rate associated with the endpoint device 703.

In some embodiments of the present disclosure, the first data transmission rate is approximately the maximum data transmission rate associated with PCIe Gen 1 or 2. In some embodiments, the maximum data transmission rate associated with PCIe Gen 1 or 2 may be approximately 5 Gigatransfers per second (5 GT/s).

In addition, during Phase 0, both devices 701, 703 may advertise the maximum data transmission rate associated with each device 701, 703. Furthermore, in some embodiments, both devices 701, 703 make the link operational enough at the PCI Express Gen 1 or 2 at a certain BER. For example, before transitioning to the next phase of the link training and equalization procedure, both devices 701, 703 must exhibit that they may transmit signals with a minimum BER of $10^{-4}$. In some embodiments, if the target BER is not reached, the link may operate at a lower data transmission rate.

Figure 8:
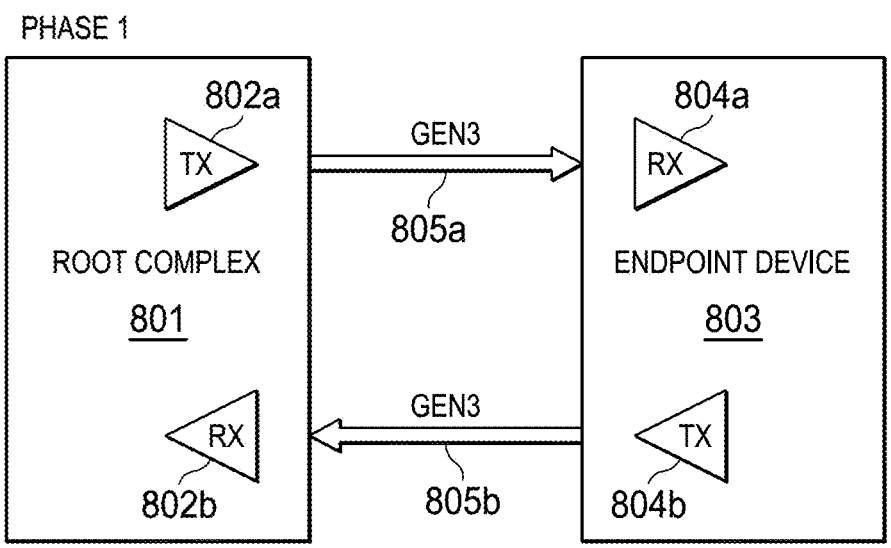
FIG. 8 is a schematic diagram illustrating an embodiment of Phase 1 of a PCIe link training and equalization procedure.

FIG. 8 is a schematic diagram illustrating an embodiment of Phase 1 of a PCIe link training and equalization procedure. As shown, root complex device 801 and endpoint device 803 (having transmitter logic 802a, 804b and receiver logic 802b, 804a) have transitioned to Phase 1 of the PCIe link training and equalization procedure.

In Phase 1 of a PCIe link training and equalization procedure, both devices 801, 803 make each lane of a communications link operational at a second data transmission rate to exchange a second set of data (e.g., TS1 Ordered Sets). In some embodiments, the second data transmission rate is greater than the first data transmission. For example, the second data transmission rate may be approximately 8 GT/s. In addition, during Phase 1, TS1 Ordered Sets may be exchanged between the two devices 801, 803.

Most notably, during Phase 1, both devices 801, 803 advertise their full swing (FS) and low frequency (LF) values. In some embodiments, a FS value may be defined as the maximum differential voltage that is generated by a transmitter component.

In addition, the sum of transmitter or receiver coefficients should be equal to FS according to some embodiments of the present disclosure:

$$FS=|C_{-1}|-|C_{-1}|+|C_{+1}|$$

Furthermore, a LF value may be defined as the minimum differential voltage that is generated by a transmitter component according to some embodiments of the present disclosure. LF values should always be greater than minimum differential voltage:

$$C_0-|C_{-1}|-|C_{+1}|\geq LF$$

The FS and LF values may be stored in the respective TS1 fields and advertised via the exchange of the TS1 Ordered Sets. As will be described below, the FS and LF values may be used in the computation of coefficients which may be applied to the transmitter or receiver settings of each device 801, 803.

In some embodiments, once the FS and LF values are received, they are stored in a storage unit in each device 801, 803. For example, the FS and LF values are stored in configuration and status register(s). In some embodiments, the configuration and status registers may be implemented as flip flop device elements.

Once stored, the present disclosure provides a mechanism to compute a set of coefficients (e.g., $C_0$, $C_{-1}$, $C_{+1}$) from the FS and LF values which may also be stored in a configuration and status register(s). In some embodiments, the computed set of coefficients includes a pre-cursor component, cursor component, and post-cursor component.

There may be numerous configuration and status registers in each device 801, 803. Each configuration and status register may have a storage capacity of tens of bits. In the aggregate, the configuration and status registers may have a storage capacity of hundreds of thousands of data bits.

In some embodiments, logic may be present within the ports (e.g., lanes) of each device 801, 803 which may determine (e.g., compute) the set of coefficients with FS and LF values as inputs. Most notably, in some embodiments of the present disclosure, the computed set of coefficients are coordinates of a midpoint along a maximum boost line.

Figure 9:
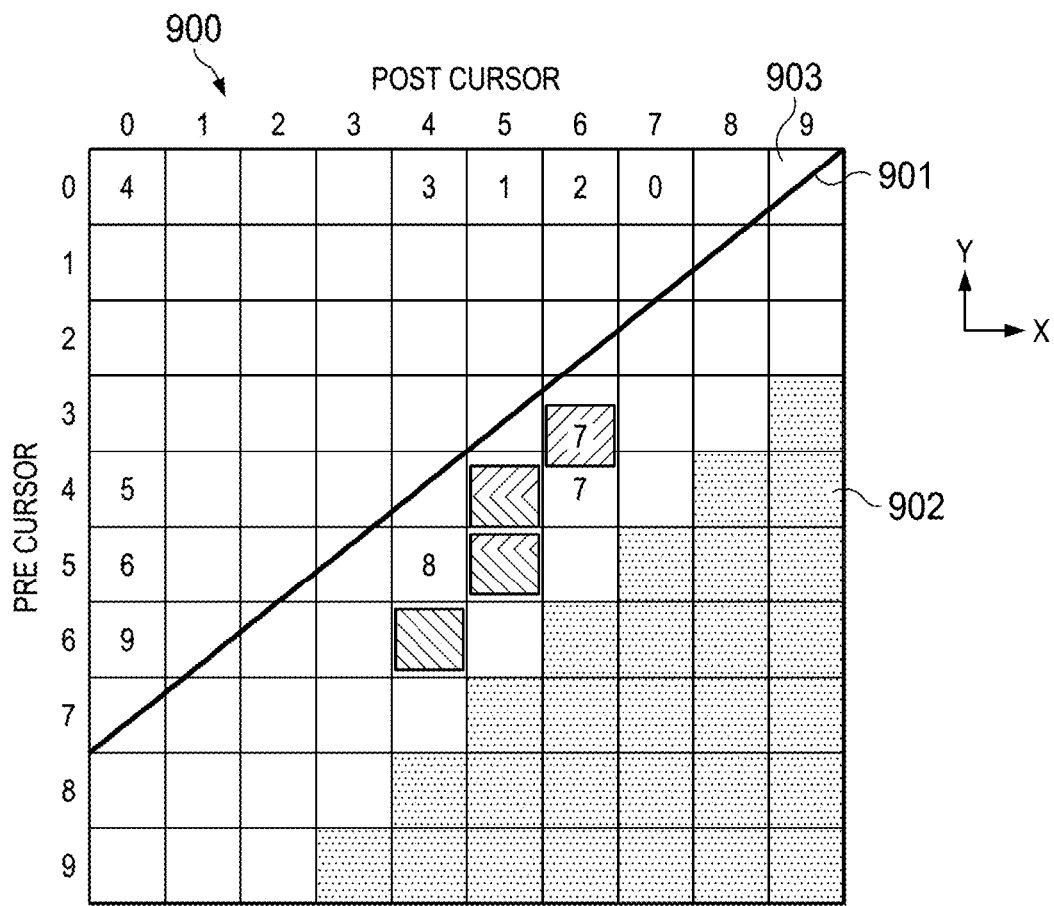
FIG. 9 is a schematic diagram illustrating a table listing a set of precursor and post curser coefficients which may be applied to a transmitter or receiver setting.

Continuing on through the figures, FIG. 9 is a schematic diagram illustrating a table 900 listing a set of precursor and post curser coefficients which may be applied to a transmitter or receiver setting. As shown, the x-axis indicates post-cursor values whereas the y-axis indicates pre-cursor values. Most notably, the diagonal line defines the maximum boost line 901. A maximum boost may be defied as a major boost that appears when there is polarity inversion for a single bit interval.

Maximum boost may be computed according to the following equation:

$$\text{Maximum boost} = 20 \log_{10} v_a/v_b$$

It should be understood by one having ordinary skill in the art that the maximum boost or maximum boost line is not constant. As such, if the link changes due to reset, hot plug disconnect/connect, the maximum boost value or maximum boost line may change.

Further, table 900 comprises a plurality of tiles 903. In some embodiments, each tile 903 represents a coefficient. In addition, the numbers in the tiles represent presets whereas the tiles 902 beyond the maximum boost line 901 are illegal coefficient space.

Because it is not possible to utilize a constant predetermined transmitter or receiver link training and equalization setting due to fact that communication links need to be established with devices of varying characteristics. As such, transmitter and receiver link training and equalization coefficient settings must be dynamically negotiated.

As described above, a remote receiver is utilized to determine whether the target BER is achieved as indicative of the BER eye height. Accordingly, the link training and equalization procedure may undergo multiple cycles to achieve optimal coefficient settings.

For example, the link training and equalization procedure applies a specific preset, corresponding to coefficient 3/5, to the transmitter or receiver settings. If the target BER is not achieved, as indicated by the height of a generated BER eye, new coefficients may be generated to find the transmitter and receiver settings that meet the target BER.

For instance, it may be revealed that the endpoint device receiver needs less post-cursor but more pre-cursor. As such, the endpoint device may send coefficient (4/4) to the remote complex device. In turn, the remote complex device applies the new coefficient (4/4) to the transmitter settings and echoes (4/4) to the endpoint device.

Once the endpoint device receives the signal from the remote complex device, the signal is evaluated by the endpoint's receiver. The evaluation may determine, for example, that the post-cursor value is sufficient but more pre-cursor is needed. The process may continue until the optimal coefficient values are identified.

Figure 10:
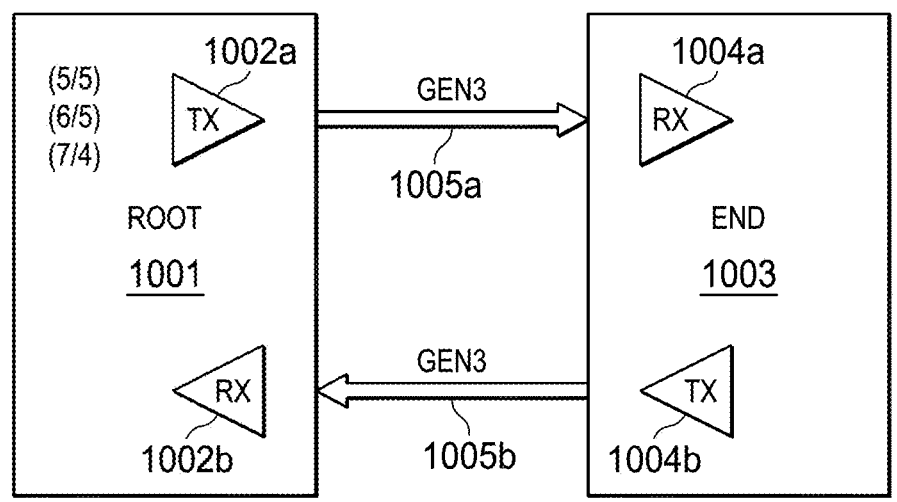
FIG. 10 is a schematic diagram illustrating an embodiment of Phase 2 of a PCIe link training and equalization procedure.

FIG. 10 is a schematic diagram illustrating an embodiment of Phase 2 of a PCIe link training and equalization procedure. As shown, root complex device 1001 and endpoint device 1003 (having transmitter logic 1002a, 1004b and receiver logic 1002b, 1004a) have transitioned to Phase 2 of the PCIe link training and equalization procedure.

In Phase 2 the upstream port (e.g., endpoint device) aids the downstream port (e.g., root complex device) to fine tune its transmitter settings unit a BER or less than or equal to $10^{-12}$ is achieved on all channels (e.g., lanes) of a communications link. An exemplary list of coefficients (5/5, 6/5, 7/4) indicate that multiple iterations may be performed to achieve the optimum link training and equalization transmitter (or receiver) settings.

Figure 11:
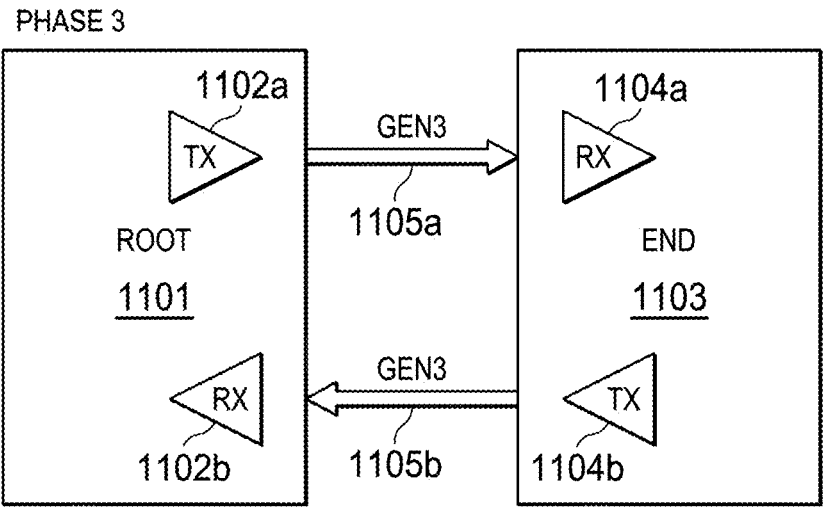
FIG. 11 is a schematic diagram illustrating a conventional Phase 3 process of a PCIe link training and equalization procedure.

FIG. 11 is a schematic diagram illustrating a conventional Phase 3 process of a PCIe link training and equalization procedure. As shown, root complex device 1101 and endpoint device 1103 (having transmitter logic 1102a, 1104b and receiver logic 1102b, 1104a) have transitioned to Phase 3 of the PCIe link training and equalization procedure. Most notably, a system and method consistent with the present disclosure may employ Phase 3 of the link training and equalization process with only a single iteration.

In some embodiments, logic within the downstream port (e.g., root complex device) utilizes FS and LF values associated with the upstream port to compute a set of coefficients which may be applied to the transmitter component of the upstream port. In some embodiments, the computed set of coefficients may be the coordinates of a midpoint along the maximum boost line.

In some embodiments, the midpoint on the boost line may be computed according to the following algorithm described below:

Case A

If FS+LF are even and divisible by 4, $C_{-1}=C_{+1}=$absolute value $[(FS-LF)/4]$, and $C_0=FS-C_{-1}-C_{+1}$.

For example, if FS=40 and LF=20, $C_{-1}$ and $C_{+1}$=5 and $C_0$=30. Thus, the midpoint of the maximum boost line and the computed coefficients are $\{5, 30, 5\}$.

Case B

If FS+LF is even but not divisible by 4, $C_{-i}=$Ceil$[(FS-LF)/4]$, $C_{+1}=$Floor$[(FS-LF)/4]$, and $C_0=FS-C_{-1}-C_{+1}$.

For example, if FS=42 and LF=20, $C_{-1}$=6, $C_{+1}$=5, and $C_0$=31. Thus, the midpoint of the maximum boost line and the computed coefficients are $\{6, 31, 5\}$.

Case C

If FS+LF is odd and (FS−LF−1=VAL) is divisible by 4, $C_{-1}=C_{+1}=$floor $[VAL/4]$, and $C_0=FS-C_{-1}-C_{+1}$.

For example, if FS=41 and LF=20, $C_{-1}=C_{+1}$=5 and $C_0$=31. Thus, the midpoint of the maximum boost line and the computed coefficients are $\{5, 31, 5\}$.

Case D

If FS+LF is odd and (FS−LF−1=VAL) is not divisible by 4, $C_{-1}=$Ceil$[VAL/4]$, $C_{+1}=$floor$[VAL/4]$, and $C_0=FS-C_{-1}-C_{+1}$.

For example, if FS+LF is odd and (FS−LF−1=VAL) is not divisible by 4, $C_{-1}=$ceil$[VAL/4]$, $C_{+1}=$floor$[VAL/4]$, and $C_0=FS-C_{-1}-C_{+1}$.

For example, if FS=42 and LF=23, $C_{-1}$=5, $C_{+1}$=4, $C_0$=33. Thus, the midpoint of the maximum boost line and the computed coefficients are $\{5, 33, 4\}$.

In addition, the generated coefficients may be applied to predetermined or pre-computed offsets. For example, during post silicon lab testing, a device may be characterized such that offsets are computed per lane in the case that the device performs less than ideal. As such, the generated coefficients may not be directly applied, however, but may be applied while taking into account these predetermined or pre-computed offsets.

It should be also understood that determining the coefficients associated with the midpoint coordinates of the maximum boost line may be a starting point and that fine tuning may be performed to increase the communication performance along each lane and link. As such, the present disclosure provides the flexibility to go beyond the midpoint coordinates starting point to any other point in any other boost line (with some margin of error).

For example, once the initial coefficients are computed (e.g., midpoint coordinates of the maximum boost line), a new set of coefficients may be computed by adding a predefined constant or set of predefined constants to the computed set of coefficients which represent the midpoint coordinates of the midpoint of the maximum boost line according to some embodiments of the present disclosure.

For instance, "1" may be a predefined constant which may be applied to generate a new set of coefficients for fine tuning. For example, if the computed set of coefficients is (3, 5, 4), applying a predefined constant of "1" should yield a new set of coefficients of (4, 6, 5) which may be applied to the transmitter or receiver settings of a device coupled to the communications link. If, for instance, the set of predefined constants is (1, 0, 0), the new set of coefficients computed should be (4, 5, 4).

In addition, a least root mean square (LMS) algorithm may be utilized for fine tuning. In some embodiments of the present disclosure, each lane of an upstream port or a downstream port may have LMS capability pre-configured therein.

One having ordinary skill in the art should appreciate that various predefined constants and/or set of predefined constants may be applied to compute new set(s) of coefficients. Moreover, a unique set of predefined constants or set of coefficients may be applied in any order or iteration to generate new set(s) of coefficients when fine tuning the communication performance of the lane or link.

Accordingly, the new set(s) of coefficients may be generated from the following equations:

$$Cm[5:0]=Cm1[5:0]+(csr\_add\_precursor\_wire[2:0]- csr\_sub\_precursor\_wire[2:0]) \quad 1)$$

$$Cp[5:0]=Cp1[5:0]+(csr\_add\_postcursor\_wire[2:0]- csr\_sub\_postcursor\_wire[2:0]) \quad 2)$$

$$C_0=FS-Cm-Cp \quad 3)$$

In some embodiments, the configuration status and register(s) are per bundle or per lane 3 bit configuration registers which are used to add or subtract an original computed value to sweep to a desired location.

Moreover, embodiments of the present disclosure further define a configuration register FS_threshold. For example, in the event the link partners FS value which is captured during Phase 1 of the link training and equalization procedure is greater than FS_threshold, equations 1, 2, and 3 above are used. However, in the event the FS value is less than FS_threshold, then the configuration registers csr_add and csr_sub values are divided by 2 for the pre-cursor and post-cursor values to provide more flexibility.

In some embodiments, a system and method consistent with the present disclosure may employ Phase 3 of a link training and equalization procedure with a single iteration such that the downstream port of the root complex device more effectively and efficiently.

It should be understood that the present disclosure may be adapted such that Phase 2 of the link training and equalization procedure may employ a method described herein to generate coefficients for the downstream port during Phase 2 of the procedure. Accordingly, the present disclosure is not limited to Phase 3 of the link training and equalization procedure and may be employed to generate coefficients for a transmitter or receiver set up for a remote device, local device, remote complex device, or endpoint device. Moreover, the present disclosure is amenable to allow for fine tuning, if needed.

Figure 12:
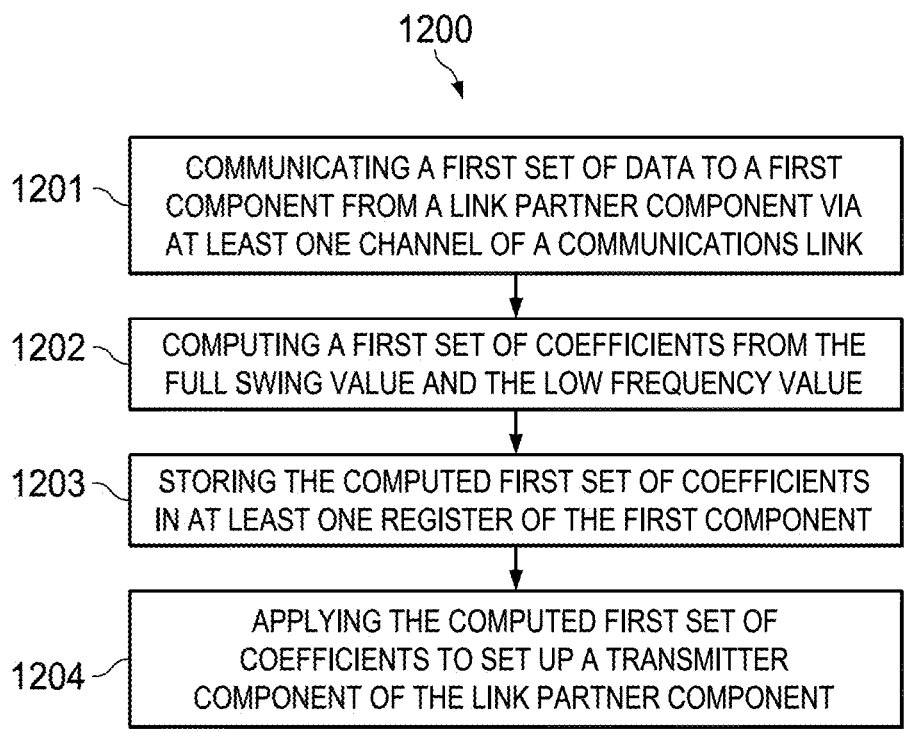
FIG. 12 shows a method for link training and equalization consistent with an embodiment of the present disclosure.

A method 1200 for link training and equalization which is consistent with some embodiments of the present disclosure is shown in FIG. 12. In some embodiments, method 1200 begins with communicating a first set of data to a first component from a link partner component along at least one channel of a communications link according to block 1201.

The first set of data may include Ordered Set(s), preset(s), hint(s), FS and LF values, etc. Additionally, the first component may be characterized as a root complex or endpoint device and may include a upstream port or downstream port.

Next, according to block 1202, computing a first set of coefficients from the FS and LF values. The first set of coefficients may be computed according to the algorithm described above. In some embodiments, the FS and LF values retrieved from the first component's link partner, is stored in storage entities (e.g., configuration and status registers) within the first component.

In some embodiments of the present disclosure, logic on the individual lanes of a port are used to compute a first set of coefficients. In some embodiments, the logic is embedded within the port of a device undergoing a link training and equalization procedure (e.g., root complex device or endpoint device).

Next, the computed set of coefficients are stored in storage entities within the first component (block 1203). For some embodiments, the computed set of coefficients is stored in a port of the first component. For instance, the computed set of coefficients may be stored in a configuration register of the port.

In time, the first component sends the computed set of coefficient to the link partner component. Next, applying the computed first set of coefficients to set up the link partner's transmitter component (block 1204).

In addition, additional data may be sent from the first component if a bit error rate associated with the communications link exceeds a target bit error rate according to some embodiments of the present disclosure.

Figure 13:
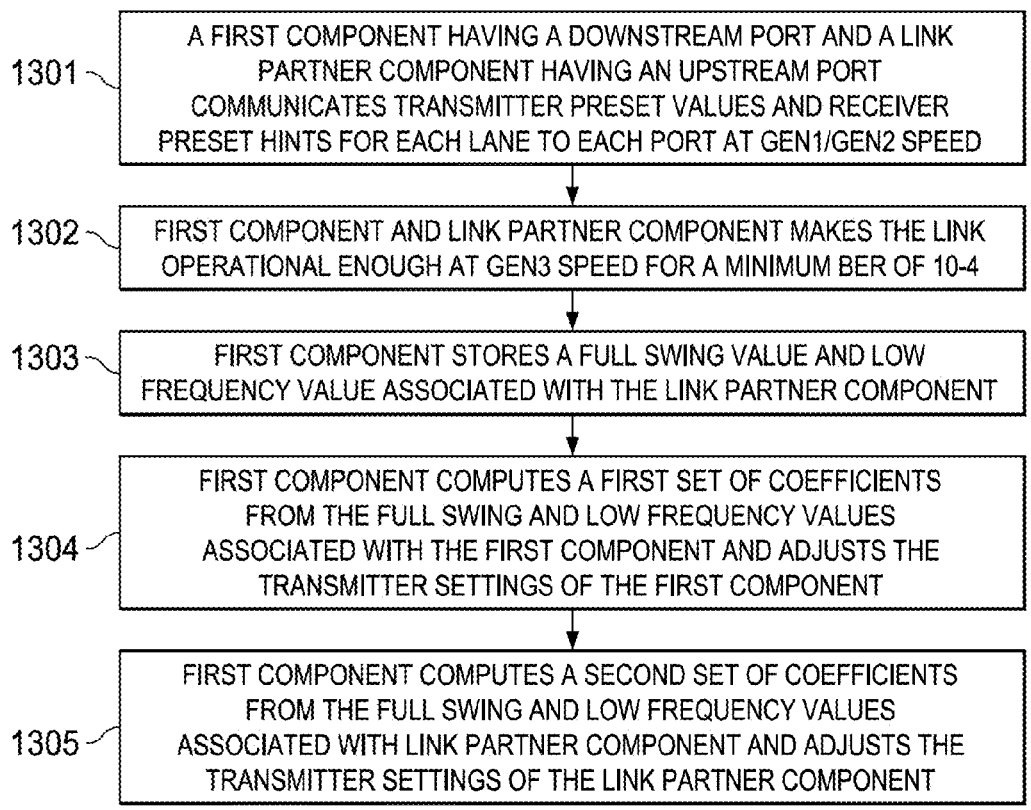
FIG. 13 shows another method for link training and equalization consistent with an embodiment of the present disclosure.

FIG. 13 shows yet another method 1300 for link training and equalization consistent with an embodiment of the present disclosure. In some embodiments, method 1300 begins with block 1301—a first component having a downstream port and a link partner component having an upstream port communicates transmitter present values and receiver preset hints for each lane to each port at Gen1/Gen2 speed.

Next, both the first component and the link partner component makes the link operational enough at Gen3 speed for a minimum BER of $10^{-4}$ (block 1302).

Block 1303 further provides that the first component stores a full swing value and low frequency value associated with the link partner component. Subsequently, a first component computes a first set of coefficients from the full swing and low frequency values associated with the first component and adjusts the transmitter settings of the first component (block 1304).

Lastly, block 1305 of method 1300 provides that the first component computes a second set of coefficients from the full swing and low frequency values associated with the link partner component and adjusts the transmitter settings of the link partner component.

Accordingly, method 1300 describes a manner how a single component coupled to a bus interface may implement the present disclosure for phases 2 and 3 of a link training and equalization procedure. As such, the present disclosure is amenable such that the devices coupled to the bus interface (e.g., first component and the link partner component) may disregard a request to apply settings, coefficients, or the like to a component's transmitter settings during a link training and equalization procedure.

The following examples pertain to further embodiments. Specifics in the examples may be used anywhere in one or more embodiments. For instance, all optional features of the apparatus or system described herein may also be implemented with respect to the method or process described herein.

Example 1

A system may comprise, in response to a first component and a link partner component of the first component undergoing equalization, the first component is to communicate a first set of data to the link partner component. The first component may comprise at least one receiver to receive a first set of equalization dat. The first component may further comprise coefficient storage coupled to the receiver to store the equalization data. In addition, coefficient logic coupled to the coefficient storage to generate a first set of coefficients based on the first set of equalization data. The first component is to send the first set of coefficients to the link partner component.

Example 2

The first set of coefficients includes midpoint coordinates along a maximum boost line.

Example 3

The first component may also be a root complex component and the link partner component is an endpoint component.

Example 4

The link component sends the first set of equalization data to the first component along a PCIe bus interface link.

Example 5

The first set of equalization data includes a full swing value and a low frequency value.

Example 6

In response to the first component and the link partner component undergoing the equalization procedure, the first component communicates a second set of data to the link partner component wherein the link partner component applies at least a portion of the second set of data for a transmitter set up of the link partner component.

Example 7

The generated first set of coefficients includes a precursor component, cursor component, and post-cursor component.

Example 8

A method, comprising communicating a first set of data to a first component from a link partner component along at least one channel of a communications link. The first set of data includes a full swing value and a low frequency value. The full swing value and the low frequency value is stored in at least one register of the first component. Executing instructions to compute a first set of coefficients from the full swing value and the low frequency value. Computing a first set of coefficients from the full swing value and the low frequency value. Storing the computed first set of coefficients in at least one register of the first component. Applying the computed first set of coefficients to set up a transmitter component of the link partner component.

Example 9

The first set of data includes a first set of preset values which includes a second set of coefficients to set up a transmitter component of the link partner component and a first set of preset hints which includes a second set of coefficients to set up a receiver component of the link partner component.

Example 10

The computed first set of coefficients includes at least one of a pre-cursor coefficient, cursor coefficient, or post-cursor coefficient.

Example 11

The first set of coefficients applied to the transmitter component of the link partner component enables the link partner component to transmit data to the first component with a bit error rate of less than or equal to one error per every $10^{12}$ bits.

Example 12

The computed first set of coefficients are applied to the transmitter component of the link partner component during Phase 3 of a PCI Gen 3 link training and equalization procedure.

Example 13

An apparatus, comprising a downstream port which in response to undergoing a link training and equalization procedure, receiving a first ordered set from an upstream port. The downstream port includes a receiver component to receive data from the upstream port and the upstream port includes a transmitter component to transmit data to the downstream port. The upstream port and the downstream port are link partners. The first ordered set includes a full swing value and a low frequency value associated with the upstream port. The downstream port comprises logic to execute instructions to compute a first set of coefficients from the full swing value and the low frequency value of the first ordered set. The downstream port comprises at least one configuration register to store the computed first set of coefficients. The upstream port applies the computed first set of coefficients to a transmitter set-up of the upstream port.

Example 14

The upstream port further includes a receiver which receives the computed first set of coefficients from the downstream port.

Example 15

The computed first set of coefficients are stored in a single configuration register.

Example 16

The at least one configuration register are implemented as flip-flop storage elements.

Example 17

Data within the at least one configuration register provides a status of the upstream port.

Example 18

The upstream port is coupled to a touch enabled display device.

Example 19

A link training and equalization procedure for devices coupled to a bus interface link, comprising: communicating a set of transmitter preset values and a set of receiver hints from a first component to a link partner component and from link partner component to the first component; configuring the first component and the link partner component to make the link operational for a first bit error rate; storing a full swing value and a low frequency value associated with the link partner component in a storage entity within the first component; computing a first set of coefficients from a full swing value and a low frequency value associated with the first component; adjusting a transmitter setting of the first component based on the first set of coefficients; computing a second set of coefficients from a full swing value and a low frequency value associated with the link partner component; and adjusting a transmitter setting of the link partner component based on the second set of coefficients.

Example 20

Configuring the first component and the link partner component to make the link operational at a second bit error rate which is less than the first bit error rate.

Example 21

Applying a set of offsets to a transmitter setting of the first component before adjusting the transmitter setting of the first component.

Example 22

The first bit error rate is one bit per every $10^4$ bits.

Example 23

The first set of coefficients are computed by logic within a port of the first component.

Example 24

An apparatus, comprising: an upstream port, including: transmitter logic to transmit data signals, receiver logic to receive data signals from the downstream port; and a storage unit to store a first set of coefficients computed from a full swing value and a low frequency value associated with the upstream port.

Example 25

The transmitter logic may adopt the first set of coefficients.

Example 26

The transmitter logic to transmit data signals to a downstream port.

Example 27

The storage unit has a memory capacity of 6 bytes.

Example 28

A non-transitory computer readable medium storing computer readable instructions for machine execution of a method for: communicating a first set of data to a first component from a link partner component along at least one channel of a communications link; wherein the first set of data includes a full swing value and a low frequency value; wherein the full swing value and the low frequency value is stored in at least one register of the first component; executing instructions to compute a first set of coefficients from the full swing value and the low frequency value; computing a first set of coefficients from the full swing value and the low frequency value; storing the computed first set of coefficients in at least one register of the first component; and applying the computed first set of coefficients to set up a transmitter component of the link partner component.

Example 29

Machine-readable storage including machine-readable instructions, when executed, to implement a method or realize an apparatus as claimed in any preceding example.

Example 30

An apparatus comprising means to perform a method as claimed in any preceding example.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform said designated task. As a purely illustrative example, a logic gate may provide a 0 or a 1 during operation. But a logic gate "configured to" provide an enable signal to a clock does not include every potential logic gate that may provide a 1 or 0. Instead, the logic gate is one coupled in some manner that during operation the 1 or 0 output is to enable the clock. Note once again that use of the term "configured to" does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases "capable of/to," and or "operable to," in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system, comprising:
in response to a first component and a link partner component of the first component undergoing equalization, the first component is to communicate a first set of data to the link partner component, the first component comprises:
at least one receiver to receive a first set of equalization data, the first set of equalization data includes a full swing value (FS) and a low frequency value (LF);
coefficient storage coupled to the at least one receiver to store the first set of equalization data;
coefficient logic coupled to the coefficient storage to generate a first set of coefficients based on the first set of equalization data, the first set of coefficients comprise: a first coefficient value ($C_1$), a second coefficient value ($C_2$), and a third coefficient value ($C_3$);
the coefficient logic is configured to generate $C_1$, $C_2$, $C_3$ such that:
if [FS+LF] is even and divisible by 4, then $C_1$ and $C_2$ are equal to the absolute value of [(FS−LF)/4], and $C_3$ is equal to [FS−$C_1$−$C_2$];
otherwise if [FS+LF] is even but not divisible by 4, then the $C_1$ equals Ceiling[(FS−LF)/4], $C_2$ equals a Floor[(FS−LF)/4], and $C_3$ equals [FS−$C_1$−$C_2$];
if [FS+LF] is odd and (FS−LF−1=VAL) is divisible by 4, then $C_1$ equals $C_2$=floor[VAL/4] and $C_3$=[FS−$C_1$−$C_2$]; and
otherwise if [FS+LF] is odd and (FS−LF−1=VAL) is not divisible by 4, then $C_1$ equals Ceiling[VAL/4], $C_2$=floor[VAL/4] and $C_3$=[FS−$C_1$−$C_2$]; and
the first component is configured to send the first set of coefficients to the link partner component.

2. The system of claim 1, wherein the first set of coefficients includes midpoint coordinates along a maximum boost line.

3. The system of claim 1, wherein the first component is a root complex component and the link partner component is an endpoint component.

4. The system of claim 1, wherein the first component sends the first set of coefficients to the link partner component via a Peripheral Component Interconnect Express (PCIe) bus interface link.

5. The system of claim 1 wherein further, in response to the first component and the link partner component undergoing the equalization, the first component communicates a second set of data to the link partner component wherein the link partner component applies at least a portion of the second set of data for a transmitter set-up of the link partner component.

6. The system of claim 1, wherein the generated first set of coefficients includes a precursor component, cursor component, and post-cursor component.

7. A method, comprising:
communicating a first set of data to a first component from a link partner component along at least one channel of a communications link, the first set of data includes a full swing value (FS) and a low frequency value (LF);
wherein the full swing value and the low frequency value is stored in at least one register of the first component;
determining, by the first component, a first set of coefficients from the full swing value and the low frequency value, the first set of coefficients comprises a first coefficient value ($C_1$), a second coefficient value ($C_2$), and a third coefficient value ($C_3$);
said determining of the first set of coefficients comprises:
if [FS+LF] is even and divisible by 4, then the $C_1$ and $C_2$ are equal to the absolute value of [(FS−LF)/4], and $C_3$ is equal to [FS−$C_1$−$C_2$];
otherwise if [FS+LF] is even but not divisible by 4, then $C_1$ equals Ceiling[(FS−LF)/4], $C_2$ equals a Floor[(FS−LF)/4], and $C_3$ equals [FS−$C_1$−$C_2$];
if [FS+LF] is odd and (FS−LF−1=VAL) is divisible by 4, then $C_1$ equals $C_2$=floor[VAL/4] and $C_3$=[FS−$C_1$−$C_2$];
otherwise if [FS+LF] is odd and (FS−LF−1=VAL) is not divisible by 4, then $C_1$ equals Ceiling[VAL/4], $C_2$=floor[VAL/4] and $C_3$=[FS−$C_1$−$C_2$];
storing the determined first set of coefficients in at least one register of the first component; and
applying the determined first set of coefficients sent by the first component in order to set-up a transmitter component of the link partner component.

8. The method of claim 7, wherein the first set of data includes a first set of preset values which includes a second set of coefficients to set-up a transmitter component of the link partner component and a first set of preset hints which includes a second set of coefficients to set-up a receiver component of the link partner component.

9. The method of claim 7, wherein the determined first set of coefficients includes at least one of a pre-cursor coefficient, cursor coefficient, or post-cursor coefficient.

10. The method of claim 7, wherein the first set of coefficients applied to the transmitter component of the link partner component enables the link partner component to transmit data to the first component with a bit error rate of less than or equal to one error per every $10^{12}$ bits.

11. The method of claim 7, wherein the determined first set of coefficients are applied to the transmitter component of the link partner component during Phase 3 of a PCI Gen 3 link training and equalization procedure.

12. An system, comprising:
a downstream port which in response to undergoing a link training and equalization procedure, receives a first ordered set from an upstream port;
the upstream port includes a transmitter component to transmit data to the downstream port;
the downstream port includes:
a receiver component to receive data from the upstream port, the upstream port and the downstream port are link partners;
wherein the first ordered set includes a full swing value (FS) and a low frequency value (LF) associated with the upstream port;

coefficient logic configured to determine a first set of coefficients from the full swing value and the low frequency value of the first ordered set, such that:
if [FS+LF] is even and divisible by 4, then the $C_1$ and $C_2$ are equal to the absolute value of [(FS−LF)/4], and $C_3$ is equal to [FS−$C_1$−$C_2$];
otherwise if [FS+LF] is even but not divisible by 4, then $C_1$ equals Ceiling[(FS−LF)/4], $C_2$ equals a Floor[(FS−LF)/4], and $C_3$ equals [FS−$C_1$−$C_2$];
if [FS+LF] is odd and (FS−LF−1=VAL) is divisible by 4, then $C_1$ equals $C_2$=floor[VAL/4] and $C_3$= [FS−$C_1$−$C_2$];
otherwise if [FS+LF] is odd and (FS−LF−1=VAL) is not divisible by 4, then $C_1$ equals Ceiling[VAL/4], $C_2$=floor[VAL/4] and $C_3$=[FS−$C_1$−$C_2$];
at least one configuration register to store the determined first set of coefficients; and
wherein the upstream port applies the determined first set of coefficients sent by the downstream port in order to set-up the transmitter component of the upstream port.

13. The system of claim 12, wherein the upstream port further includes a receiver which receives the determined first set of coefficients from the downstream port.

14. The system of claim 12, wherein the determined first set of coefficients are stored in a single configuration register.

15. The system of claim 12, wherein the at least one configuration register are implemented as flip-flop storage elements.

16. The system of claim 12, wherein data within the at least one configuration register provides a status of the upstream port.

17. The system of claim 12, wherein the upstream port is coupled to a touch enabled display device.

18. A link training and equalization procedure for devices coupled to a bus interface link, comprising:
communicating a set of transmitter preset values and a set of receiver hints from a first component to a link partner component and from the link partner component to the first component;
configuring the first component and the link partner component to make the link operational for a first bit error rate;
storing a full swing value and a low frequency value associated with the link partner component in a storage entity within the first component;
determining, by the first component, a first set of coefficients from a full swing value (FS) and a low frequency value (LF) associated with the first component, the determining of the first set of coefficients comprising:
if [FS+LF] is even and divisible by 4, then the $C_1$ and $C_2$ are equal to the absolute value of [(FS−LF)/4], and $C_3$ is equal to [FS−$C_1$−$C_2$];
otherwise if [FS+LF] is even but not divisible by 4, then $C_1$ equals Ceiling[(FS−LF)/4], $C_2$ equals a Floor [(FS−LF)/4], and $C_3$ equals [FS−$C_1$−$C_2$];
if [FS+LF] is odd and (FS−LF−1=VAL) is divisible by 4, then $C_1$ equals $C_2$=floor[VAL/4] and $C_3$=[FS−$C_1$−$C_2$];
otherwise if [FS+LF] is odd and (FS−LF−1=VAL) is not divisible by 4, then $C_1$ equals Ceiling[VAL/4], $C_2$=floor[VAL/4] and $C_3$=[FS−$C_1$−$C_2$];

adjusting a transmitter setting of the first component based on the first set of coefficients;
determining, by the first component, a second set of coefficients from a full swing value and a low frequency value associated with the link partner component; and
adjusting a transmitter setting of the link partner component based on the second set of coefficients sent by the first component.

19. The link training and equalization procedure of claim 18 further comprising configuring the first component and the link partner component to make the link operational at a second bit error rate which is less than the first bit error rate.

20. The link training and equalization procedure of claim 18 further comprising applying a set of offsets to the transmitter setting of the first component before the adjusting of the transmitter setting of the first component.

21. The link training and equalization procedure of claim 18, wherein the first bit error rate is one bit per every $10^4$ bits.

22. The link training and equalization procedure of claim 18, wherein the first set of coefficients are determined by logic within a port of the first component.

23. An apparatus, comprising:
a downstream port which in response to undergoing a link training and equalization procedure, receives a first ordered set from an upstream port;
the downstream port includes:
a receiver component to receive data from the upstream port, the upstream port and the downstream port are link partners;
wherein the first ordered set includes a full swing value (FS) and a low frequency value (LF) associated with the upstream port;
coefficient logic configured to determine a first set of coefficients from the full swing value and the low frequency value of the first ordered set, such that:
if [FS+LF] is even and divisible by 4, then the $C_1$ and $C_2$ are equal to the absolute value of [(FS−LF)/4], and $C_3$ is equal to [FS−$C_1$−$C_2$];
otherwise if [FS+LF] is even but not divisible by 4, then $C_1$ equals Ceiling[(FS−LF)/4], $C_2$ equals a Floor[(FS−LF)/4], and $C_3$ equals [FS−$C_1$−$C_2$];
if [FS+LF] is odd and (FS−LF−1=VAL) is divisible by 4, then $C_1$ equals $C_2$=floor[VAL/4] and $C_3$= [FS−$C_1$−$C_2$];
otherwise if [FS+LF] is odd and (FS−LF−1=VAL) is not divisible by 4, then $C_1$ equals Ceiling[VAL/4], $C_2$=floor[VAL/4] and $C_3$=[FS−$C_1$−$C_2$];
at least one configuration register to store the determined first set of coefficients;
a transmitter component to transmit the determined first set of coefficients to the upstream port; and
wherein the upstream port applies the determined first set of coefficients transmitted by the downstream port in order to set-up a transmitter of the upstream port.

24. The apparatus of claim 23, wherein the determined first set of coefficients are stored in a single configuration register.

* * * * *